United States Patent
Krieger et al.

(10) Patent No.: US 7,944,390 B2
(45) Date of Patent: May 17, 2011

(54) HIGH-RESOLUTION SYNTHETIC APERTURE SIDE VIEW RADAR SYSTEM USED BY MEANS OF DIGITAL BEAMFORMING

(75) Inventors: Gerhard Krieger, Gauting (DE);
Nicolas Gebert, München (DE);
Alberto Moreira, Olching (DE)

(73) Assignee: Deutsches Zentrum für Luft- und Raumfahrt e.V., Köln (DE)

( * ) Notice: Subject to any disclaimer, the term of this patent is extended or adjusted under 35 U.S.C. 154(b) by 61 days.

(21) Appl. No.: 12/226,785

(22) PCT Filed: May 4, 2007

(86) PCT No.: PCT/EP2007/003921
§ 371 (c)(1),
(2), (4) Date: Oct. 28, 2008

(87) PCT Pub. No.: WO2007/131642
PCT Pub. Date: Nov. 22, 2007

(65) Prior Publication Data
US 2009/0109086 A1     Apr. 30, 2009

(30) Foreign Application Priority Data
May 13, 2006   (DE) .................. 10 2006 022 814

(51) Int. Cl.
*G01S 13/90* (2006.01)
*G01S 13/00* (2006.01)

(52) U.S. Cl. .............. 342/25 F; 342/25 R; 342/25 A; 342/25 B; 342/118; 342/134; 342/135; 342/175; 342/176; 342/179; 342/195

(58) Field of Classification Search ....... 342/25 R–25 F, 342/73–81, 175, 195, 368–377, 118, 134–145, 342/176, 179
See application file for complete search history.

(56) References Cited

U.S. PATENT DOCUMENTS

| 3,725,915 | A | * | 4/1973 | Herman et al. | 342/25 D |
| 4,045,795 | A | * | 8/1977 | Fletcher et al. | 342/25 E |
| 4,064,510 | A | * | 12/1977 | Chabah | 342/25 C |
| 4,150,376 | A | * | 4/1979 | Blythe et al. | 342/25 B |

(Continued)

FOREIGN PATENT DOCUMENTS

DE      1 814 200       8/1969

(Continued)

OTHER PUBLICATIONS

T. Stimac, "Definition of Frequency Bands (VLF, ELF . . . etc.)"; posted on the Internet at vlf.it; not dated.*

(Continued)

*Primary Examiner* — Bernarr E Gregory
(74) *Attorney, Agent, or Firm* — Collard & Roe, P.C.

(57) ABSTRACT

The transmission antenna (10) of the high-resolution synthetic aperture side view radar system comprises a plurality of sub-apertures (7, 8, 9). In each individual transmission pulse, said sub-apertures are controlled in such a manner that a spatiotemporally non-separable multi-dimensional high-frequency waveform is produced as an transmission signal pulse form, such that the modulation of each transmission pulse has a spatiotemporal diversity which is not described by the product having functions which are independent from each other and which are dependent on, respectively, only one spatial dimension. The thus produced transmission pulse form is combined to a capture-sided spatial filtering by means of digital beamforming adapted to said transmission signal pulse form.

20 Claims, 7 Drawing Sheets

U.S. PATENT DOCUMENTS

| | | | | |
|---|---|---|---|---|
| 4,462,032 | A | * | 7/1984 | Martin .......................... 342/25 D |
| 4,694,300 | A | * | 9/1987 | McRoberts et al. ........... 342/195 |
| 4,908,625 | A | * | 3/1990 | Anthouard et al. ........ 342/25 A |
| 5,191,344 | A | * | 3/1993 | Moreira ....................... 342/25 A |
| 6,870,500 | B2 | * | 3/2005 | Suess et al. .................. 342/25 F |
| 2003/0218565 | A1 | | 11/2003 | Budic |
| 2005/0237236 | A1 | | 10/2005 | Budic |
| 2006/0152403 | A1 | | 7/2006 | Wicks et al. |

FOREIGN PATENT DOCUMENTS

| | | | |
|---|---|---|---|
| DE | 10 2005 062031 A1 | | 6/2007 |
| EP | 1 241 487 B1 | | 9/2002 |
| EP | 1241487 A1 | * | 9/2002 |
| EP | 1 141 748 B1 | | 3/2005 |
| EP | 1 159 637 B1 | | 1/2008 |

OTHER PUBLICATIONS

Bliss D W et al Institute of Electrical and Electronics Engineers: "Multiple-input multiple-output (MIMO) radar and imaging: degrees of freedom and resolution" Conference Record of the 37$^{TH}$ Asilomar Conference on Signals, Systems, & Computers, Pacific Groove, CA, Nov. 9-12, 2003, Asilomar Conference on Signals, Systems and Computers, New York, NY: IEEE, US, vol. 1 of 2. Conf. 37, Nov. 9, 2003, pp. 54-59, XP010701593; ISBN: 0-7803-8104-1 *Section I-B: "MIMO Radar," p. 54 *Section III-B: "Extension Dimensional Processing," p. 55.

Malliot, Harold A., "Wide Swath SAR and Radar Altimeter", Nov. 11, 1992; Lockheed Missiles & Space Company, Inc. Research & Development Division, 0-7803-0980-4/93/1993 IEEE.

A. Currie, M.A.Brown, "Wide-swath SAR", IEE, Proceedings-F, vol. 139, No. 2, Apr. 1992.

Krieger, Gerhard, et al., "Unambiguous SAR Signal Reconstruction From Nonuniform Displaced Phase Center Sampling" IEEE Geoscience and Remote Sensing Letters, vol. 1, No. 4, Oct. 2004.

Carrara, et al., "Spotlight Synthetic Aperture Radar: Signal Processing Algorithms", Boston: Artech House, 1995, pp. 4, 5, 30-45.

* cited by examiner

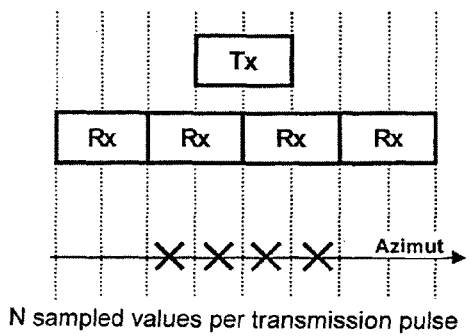
N sampled values per transmission pulse
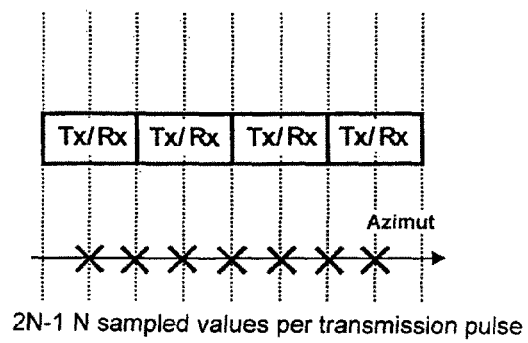
2N-1 N sampled values per transmission pulse
Fig.10      Fig.11
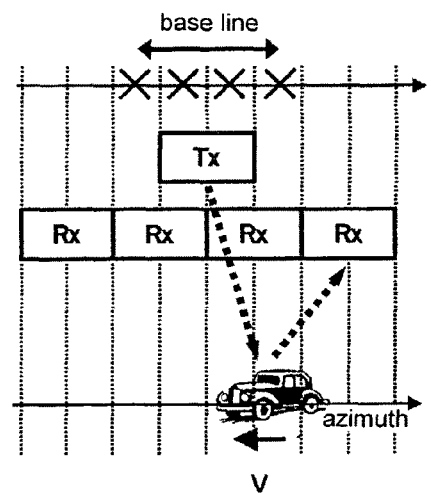
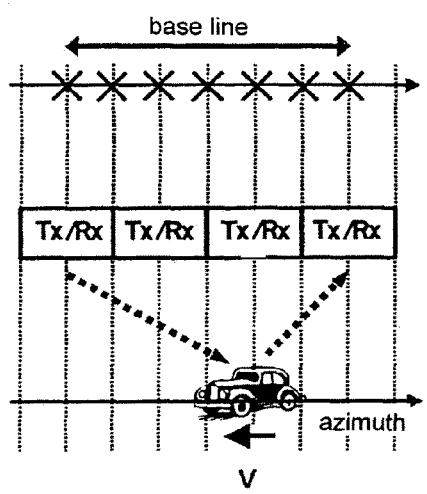
Fig.12

US 7,944,390 B2

HIGH-RESOLUTION SYNTHETIC APERTURE SIDE VIEW RADAR SYSTEM USED BY MEANS OF DIGITAL BEAMFORMING

CROSS REFERENCE TO RELATED APPLICATIONS

This application is the National Stage of PCT/EP2007/003921 filed on May 4, 2007, which claims priority under 35 U.S.C. §119 of German Application No. 10 2006 022814.6 filed on May 13, 2006. The international application under PCT article 21(2) was not published in English.

TECHNICAL FIELD

The invention refers to a high-resolution synthetic aperture side view radar system on a carrier moving above the surface of the earth at a constant speed, on which carrier a transmission and receiving antenna directed obliquely downward orthogonal to the direction of movement and a coherently operating radar device are arranged, the radar device periodically emitting high-frequency pulses with a pulse repetition frequency via the transmission antenna and receiving echo signals in several receiving channels via the receiving antenna divided into a plurality of sub-antennas in the azimuth and elevation directions, the echo signals being digitally processed by means of spatial filtering in the manner of the so-called "digital beamforming" to obtain additional directional information.

A synthetic aperture radar system, shortly referred to as SAR, is an instrument for remote sensing which is increasingly employed for mapping, monitoring and examining the surface of the earth. As illustrated in FIG. 1, such a radar system comprises a carrier 1, an aircraft in the present case, moving above the surface of the earth at a constant speed $v_s$, a transmission and receiving antenna directed orthogonal to the direction of movement and a coherently operating radar device that periodically emits electromagnetic high-frequency pulses at a pulse repetition frequency abbreviated as PRF.

The direction of movement of the carrier 1 is referred to as the azimuth direction and the direction orthogonal thereto and directed obliquely downward is referred to as the range direction. In a normal SAR operation mode, referred to as swath mode, a ground swath 2 having the length of the distance flown is mapped while flying over an area to be monitored. The width $L_{Swath}$ of the swath 2 depends on the duration of the time window during which the radar echoes, which are reflections of a pulse transmitted, are received. The duration of this time window is restricted upward by the time interval Δt between two successive pulses, i.e. the reciprocal value of the pulse repetition frequency PRF. In the embodiment illustrated, the successive high-frequency pulses are emitted at the times $t_0, t_1, t_2, \ldots$ In the receiver of the radar device, the echoes received are mixed down, quadrature demodulated, digitized and stored in a two-dimensional echo memory.

Signals reflected from a punctiform target ("point target") on the ground are received as echoes as long as the target is within the incident surface 3 of the antenna lobe 4. The length of the distance over which a target contributes to the received signal is referred to as the synthetic aperture. As a consequence of the variation in the distance between the antenna and the point target occurring while the antenna flies past the target, a change in the target distance over the synthetic aperture is obtained that causes a modulation of the received azimuth signal. By approximation, a linear frequency modulation is obtained whose bandwidth depends on the velocity and the size of the antenna, since the same determines how long the target is within the antenna lobe and thus defines the time during which echoes can be received from the target.

It should be observed in this context that the PRF that represents the sampling rate in the azimuth is chosen larger than the bandwidth of the modulation in order to sample the azimuth signal according to the Nyquist criterion. Pulse compression in the azimuth is achieved with an optimum filter and means a coherent adding up of all echoes belonging to an azimuth position. If the Nyquist criterion was infringed during the sampling of the azimuth signal, this leads to ambiguities of a target upon pulse compression.

With conventional SAR systems, a good azimuth resolution requires a large Doppler bandwidth resulting from the modulation of the received signal due to the moving platform. Sampling an azimuth signal with a large Doppler bandwidth requires a high PRF so as to meet the Nyquist criterion and to avoid ambiguities in the azimuth.

In contrast thereto, obtaining a wide mapping swath requires a long receiving window. This necessitates a sufficient time interval between successive transmission pulses and thus a PRF as low as possible.

As a consequence, a high azimuth resolution requires a high PRF, while a low PRF is needed for a wide swath. Accordingly, the simultaneous optimizing of the swath width and the azimuth resolution entail opposing requirements to the design of SAR systems that can not be met at the same time.

PRIOR ART

In order to avoid the limitations of a narrow swath width or too low a resolution, conventional SAR systems are operated in special modes that will be explained in short hereunder. However, these are not successful in simultaneously improving both the swath width and the resolution.

A special operational mode of existing conventional SAR systems intended to guarantee a high geometric azimuth resolution is the so-called spotlight mode described, for example, in the book by Carrara, W., Goodman, R. Majewski, R.: "Spotlight Synthetic Aperture Radar: Signal Processing Algorithms", Boston: Artech House, 1995. In this mode, the antenna lobes of the transmission and receiving antenna are pivoted in the azimuth direction such that a certain area is illuminated for as long as possible.

The antenna beam is first pivoted to the maximum in the flight direction, so as to illuminate the target as early as possible, and it is then tracked with respect to the target area while the sensor flies by, thereby causing a large bandwidth of the azimuth signal and thus a high resolution. However, it is a fundamental drawback of this mode that the swath to be mapped can only be illuminated on the ground point by point in this manner, whereby a continuous illumination is not possible. The swath mapped may thus have a high resolution, however, at the expanse of gaps in the radar picture.

In order to achieve as large a swath width as possible, the so-called ScanSAR mode is used that is described in the article by A. Currie and M. A. Brown: "Wide-Swath SAR", IEE Proceedings—Radar Sonar and Navigation, 139 (2), pages 122-135, 1992. Like the spotlight mode, the ScanSAR mode is also based on a control of the antenna lobes of the transmission and receiving antenna, however, in the elevation direction. To achieve this, the swath to be mapped is divided into a plurality of partial swaths. Each partial swath is then illuminated for a defined number of transmission pulses by appropriately controlling the antenna diagram.

This corresponds to a reduction of the synthetic aperture, which eventually entails a reduced geometric resolution in the azimuth direction. A sequential addressing of all partial swaths will then yield a wide total swath, yet at the expense of a reduced azimuth resolution.

In order to overcome the inherent restriction regarding the swath width and the geometric resolution of space-based SAR systems, several methods have been suggested so far which all rely on a splitting of the receiving antenna into a plurality of sub apertures with separate receiving channels. A small antenna serves as the respective transmission antenna, which at the same time illuminates a large area on the ground. FIG. 2 illustrates an example of such a known system with separate transmission and receiving antennas.

The example illustrated in FIG. 2 is a multi-aperture system for mapping wide swaths with a high geometric resolution. The transmission antenna 5 and the receiving antenna 6 are situated on the same platform and move together in the azimuth direction above the earth surface at a speed $v_s$. The receiving antenna 6 is subdivided and is formed by a plurality of antenna elements both in the azimuth and in the elevation. In contrast therewith, the transmission antenna 5 is formed by a single element only, whose dimensions correspond to the individual elements of the receiving antenna 6.

Splitting the receiver into a plurality of separate receiving channels allows to obtain additional information about the direction of the reflected signal. This is effected by a digital processing of the individual sub-aperture signals often also referred to as "Digital Beamforming on Receive". Different variants are possible in realizing this so-called "Digital Beamforming". It may be effected either a posteriori after the signal from each single receiving aperture has been mixed down, digitized and stored, or it is effected in real-time and only the result of this digital processing is recorded.

Subdividing the receiving antenna in the azimuth with separate digital recording of the signals of the individual receiving elements leads to a system which, in contrast with the implementation of only one receiving antenna, receives additional sampling values, since, per transmission pulse, an echo is received in each receiving channel at a slightly different antenna position. Optimally, these additional sampling values and an appropriate a posteriori processing of the signals allow for a reduction of the PRF without greater azimuth ambiguities resulting therefrom, as is described in the article by G. Krieger, N. Gebert, A. Moreira: "Unambiguous SAR Signal Reconstruction from Non-Uniform Displaced Phase Centre Sampling", IEEE Geoscience and Remote Sensing Letters, Vol. 1, No. 4, October 2004. This in turn allows a mapping of a wider swath on the ground.

The use of a plurality of receiving apertures in elevation may eventually be utilized to suppress ambiguities in the range direction and/or to increase the antenna gain. The latter is achieved by producing a narrow antenna lobe and controlling the same in real time such that it follows the backscattered radar pulses on the ground as described in patent document EP 1 241 487 B1.

An essential feature of all concepts suggested so far for mapping a wide swath with a high geometric resolution is a high complexity on the receiving side in combination with a single simple and separate transmission aperture. Here, the transmission antenna may be realized either on the same platform as the receiving antenna or on a platform of its own. In this context, the sole object of the transmission antenna is to guarantee the large-area illumination of the target area.

Therefore, the size of the transmission antenna is generally chosen such in an a posteriori beamforming that it is not larger than the size of a sub-aperture of the receiving antenna so as to guarantee an illumination on the ground that corresponds at least to the antenna lobe of the receiving apertures. In case of a real-time processing, this is not an ultimate necessity, since the minimum size is defined here by the region to be mapped. However, these cases also require a transmission antenna that is clearly smaller than the receiving antenna in order to illuminate the wide swath required.

Accordingly, all previous suggestions regarding a simultaneous increase of the swath width and the geometric resolution rely on the implementation of a relatively small separate transmission antenna that guarantees a large-area i8llumination on the ground. This may allow for a separate optimizing of the transmission and receiving branches of the SAR system, yet requires two different antennas and limits the flexibility to operate the radar in modes such as ScanSAR and Spotlight, as well as in novel hybrid modes. Besides, the known SAR systems do not allow for a purposeful and flexible distribution of the transmission power over the ground, which is a drawback especially with the large swath widths in the systems discussed herein.

All known SAR systems for mapping a wide swath with a high geometric resolution comprise a large receiving antenna. The same is not used for transmission purposes, however, although it would be useful for the suppression of ambiguities and for obtaining a higher gain to profit from the large antenna surface also on the transmission side. The use of a combined transmission and receiving antenna would further allow for the implementation of proven T/R technology (switching between transmission and receiving).

As already mentioned, known SAR systems allow for a suppression of azimuth ambiguities by a suitable signal processing of the individual receiving signals. To achieve this, it is necessary, however, to adjust the PRF to the velocity of the carrier platform and to the antenna length. Deviations from the optimum PRF lead to a reduced suppression of ambiguities. If, die to the timing, only a unfavourable PFR can be selected, this causes a degradation of the performance of the SAR system.

In the known SAR systems, mapping a wide swath requires a small transmission antenna. To compensate for the antenna gain lost, a large antenna surface with a plurality of receiving apertures in elevation is required on the receiving side. Yet, this results in very large amounts of data that must be stored and transmitted to the ground. An approach to a reduction of this amount of data is suggested by the method indicated in EP 1 241 487 B1.

Here, the antenna beam is controlled in real time such that it tracks the expected path of the radar echo on the ground. Therefore, only the resulting output signal has to be stored, whereby the amount of data is reduced significantly. However, this method is very sensitive to the topography of the area to be mapped so that differences in altitude may cause great losses in the signal energy received, since the receiving beam does not point exactly in the direction of the echo on the ground.

Radar systems with a plurality of receiving channels in the flight direction may basically be used for measuring movement. Examples to be mentioned in this context are the measurement of sea currents and large-area traffic control. The measuring accuracy is directly proportional to the maximum distance between the receiving antennas. To achieve a high sensitivity to slow object velocities, long antenna structures are thus required. However, these come with a significant technical effort and thus high cists.

SUMMARY OF THE INVENTION

Due to their recording principle, the known conventional SAR systems, which per se are remote sensing instruments flexibly useful in a plurality of applications in the field of earth observation, have a basic limitation which makes it impossible to map large areas and simultaneously reach a high geometric resolution.

It is an object of the present invention to overcome these basic limitations of conventional SAR systems and to increase the capacity of future mapping SAR systems such that a wide swath of ground, that is a large area, can be mapped and a high geometric resolution can be obtained at the same time.

According to the invention, which refers to a synthetic aperture side view radar system of the type mentioned in the introduction, this object is solved by the fact that the transmission antenna is formed by a plurality of sub-apertures that constitute transmission elements and are controlled such within each single transmission pulse that a spatiotemporal non-separable multi-dimensional high-frequency waveform is obtained as the transmission signal, so that the modulation of each transmission pulse has a spatiotemporal diversity that can not be described by the product of functions that are independent of each other and which depend on only one spatial dimension, respectively, and that the transmission signal pulse form thus produced is combined with the spatial filtering on the receiving side by means of a "digital beamforming" adapted to this transmission signal pulse form.

The present invention achieves the present object by implementing spatiotemporal non-separable multidimensional waveforms as the transmission signal. This means that the modulation has a novel spatial diversity within a transmission pulse, which hitherto has been unknown in SAR systems. This offers the advantageous possibility to obtain additional information about the direction of the reflected signal. According to the present invention, this information may be used, in combination with "digital beamforming", in the receiving branch to realize a high geometric resolution while at the same time mapping a wide swath of ground.

Further, this allows to significantly increase the capability of future mapping radar systems as compared with conventional SAR systems. Examples may be seen in an improved illumination of the target area, extended possibilities for detecting moving objects, a clear reduction of the data rate without loss of information, or an adaptive distribution of the transmission power. The present invention also holds the key to the implementation of hybrid radar mapping modes, wherein the available resources are distributed unevenly over the scene to be mapped. This allows to monitor certain sections of a scene with a higher geometric and/or radiometric resolution without losing a large cover as it is required, for example, for a background mission with moderate requirements with respect to resolution.

In an advantageous manner, the transmission antenna formed by a plurality of sub-apertures is structurally combined with the receiving antenna comprising a plurality of sub-antennas and allowing for "digital beamforming".

The individual transmission elements, and thus the sub-apertures in the azimuth and/or in the elevation of the transmission antenna within a transmission pulse, may either be controlled by varying the respective phase coefficient or also by separate function generator such that radar transmission pulses with a spatiotemporally non-separable waveform are obtained.

However, it is also possible to sequentially control individual transmission elements or a plurality of transmission elements at the same time, and thus sub-apertures in the azimuth and/or in the elevation of the transmission antenna within a transmission pulse, such that radar transmission pulses with a spatiotemporally non-separable waveform are obtained.

Advantageous and suitable embodiments of the method according to the invention are indicated in the subclaims that refer either directly or indirectly to claim 1.

DESCRIPTION OF THE DRAWINGS

The present invention and embodiments thereof will be explained hereinafter with reference to the drawings. In the Figures.

DESCRIPTION OF THE INVENTION

The basis of the present invention is a SAR system operated with non-separable multi-dimensional waveforms as the transmission signal. This means that the modulation of a high-frequency transmission pulse has a spatiotemporal diversity that can not be described by the product of functions that are independent from each other and depend on only one spatial dimension, respectively. It is of great importance in this context that the modulation is effected within a single transmission pulse.

Figure 4:
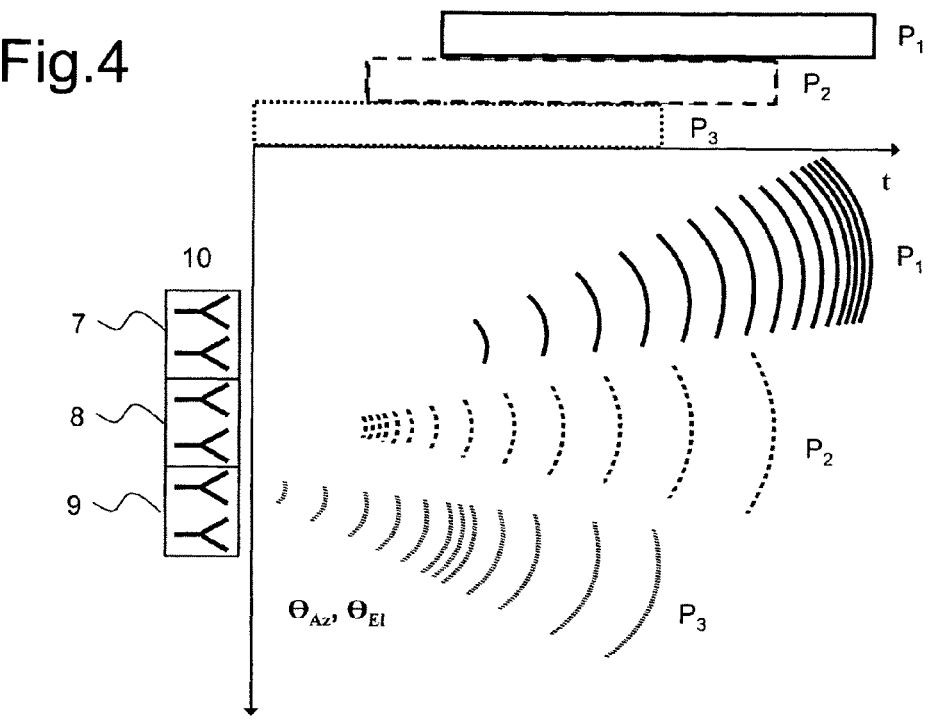
FIG. 4 is an example for the general case of a transmission pulse that, according to the present invention, has a spatiotemporally non-separable waveform and is formed by three sub-pulses that overlap in time and, on the other hand, have different respective modulations depending on the azimuth and/or elevation direction (characterized by the angles $\theta_{Az}$ and $\theta_{El}$, FIG. 5 illustrates a possible embodiment of a multi-aperture transmission antenna for multidimensional spatiotemporal pulse coding, configured according to the present invention, which embodiment may be considered exemplary for following embodiments and illustrates four sub-elements in the azimuth, each supplied by its own function generator, and wherein the sub-apertures are controlled in the elevation through separate controllable phase shifters so as to allow for the beamforming and beam controlling in the elevation direction, FIG. 6 is a schematic (on the left) and a three-dimensional (on the right) illustration of a spatially non-separable waveform formed by three sub-pulses along the range direction ("t"), whose amplitude maximum is directed in respective different azimuth directions ("$\theta_{Az}$"), wherein the transmission pulse is thus formed by three narrow azimuth beams that are controlled sequentially, FIG. 7 illustrates the distribution and suppression of the energy of the azimuth ambiguities along the range direction by using non-separable multi-dimensional waveforms, as provided by the invention, wherein the left picture illustrates the point target response of a conventional "digital beamforming" system with four receiving apertures and only one transmission aperture, the illustration in the middle shows the distribution of the energy along the range direction by using four transmission apertures and the special transmission pulse form schematically illustrated in FIG. 6, and the picture on the right illustrates the resulting point target response after the energy distributed along the range direction by "beamforming on receive" has been suppressed in the elevation, from which it becomes obvious that the remaining energy of the azimuth ambiguities is significantly reduced in contrast with systems that only use "digital beamforming on receive", FIG. 8 illustrates the time-dependent elevation-related variation of the angle of radiation of the transmission pulse, which causes a simultaneous reception of the respective echoes, wherein, in the example illustrated, the area on the ground is covered by three partial beams sequentially controlled within a transmission pulse in the direction of the respective associated elevation angle, FIG. 9 illustrates the waveform of a transmission pulse with a spatially sequential "coding", wherein the case illustrated shows the sequential control of three transmission modules and the three associated emitted partial pulses, FIG. 10 illustrates the effective phase centres and thus shows sampled values in the azimuth for a conventional combination of a simple transmission antenna (tx) and a multi-aperture receiving antenna (Rx) with N receiving elements so that N sampled values are obtained per transmission pulse, FIG. 11 illustrates the effective phase centres and thus shows sampled values in the azimuth dimension for N Tx/Rx modules, each transmitting with a sequential "code", so that 2N−1 sampled values are obtained in this case per transmission pulse, FIG. 12 illustrates the effective phase centres and the resulting maximum base line for the conventional case (left side) and with the use of sequential pulse forms within a transmission pulse (right side), so that, compared to the conventional case, a doubling of the length of the base line is obtained through the use of spatiotemporally non-separable transmission pulses.

In this context, reference is made to FIG. 4 for clarification, the Figure illustrating an example for the general case of a transmission pulse starting from a plurality sub-apertures 7, 8, 9 of a transmission antenna 10 and having a spatiotemporally non-separable waveform and being made up of three sub-pulses $P_1$, $P_2$, $P_3$ that, on the one hand, overlap in time and, on the other hand, have a different modulation depending on the azimuth and/or elevation direction (characterized by the angles $\theta_{Az}$ and $\theta_{El}$).

Mathematically, the difference over the conventional kind of modulation without spatiotemporal diversity illustrated in FIG. 3 can be explained as follows. Hitherto, the transmission pulse $P_0$ starting from a transmission antenna 11 with a single transmission aperture could be described as a function of the azimuth angle $\theta_{Az}$, the elevation angle $\theta_{EL}$ and the time t, as follows: $w(\theta_{Az}, \theta_{El}, t) = w_1(\theta_{Az}) \cdot w_2(\theta_{El}) \cdot w_3(t)$. In the typoe of modulation suggested by the present invention, this splitting or separation into individual factors that describe the modulation in each of the spatiotemporal directions ($\theta_{Az}$, $\theta_{EL}$, t) is no longer possible, which gave rise to the term spatiotemporally non-separable waveform.

The SAR system suggested by the present invention is based on a transmission antenna formed by a plurality of sub-apertures and is combined with a receiving antenna that allows for "digital beamforming". The individual transmission elements are now controlled within a transmission pulse either under variation of the respective phase coefficients or by separate function generators, such that radar pulses with a spatiotemporally non-separable waveform are obtained. Another possibility is a sequential control of partial apertures during a pulse. In all these methods, it is advantageous to use a structurally combined transmission and receiving antenna in order to make use of the full size and complexity of the receiving antenna which is present anyway.

The present combination of this novel transmission pulse form with a spatial filtering on the receiving side by digital beamforming is of great importance because of the receiving antenna ("digital beamforming on receive"). For only the connection of a spatially non-separable waveform as a transmission pulse with a "processing" on the receiving side, adapted to this pulse, using an appropriate beamforming allows to make full use of the transmission pulse form and to decisively increase the performance of prior systems.

Known SAR systems use multi-aperture antennas only on the receiving side, but do not provide for such a complexity of the transmission antenna and the resulting possibilities for a purposeful spatiotemporal influencing of the transmission pulse, as is the case in the present invention. As a consequence, there is no method yet that would implement multi-dimensional spatiotemporally non-separable waveforms in a multi-aperture SAR system to suppress ambiguities and to enhance the performance.

Figure 1:
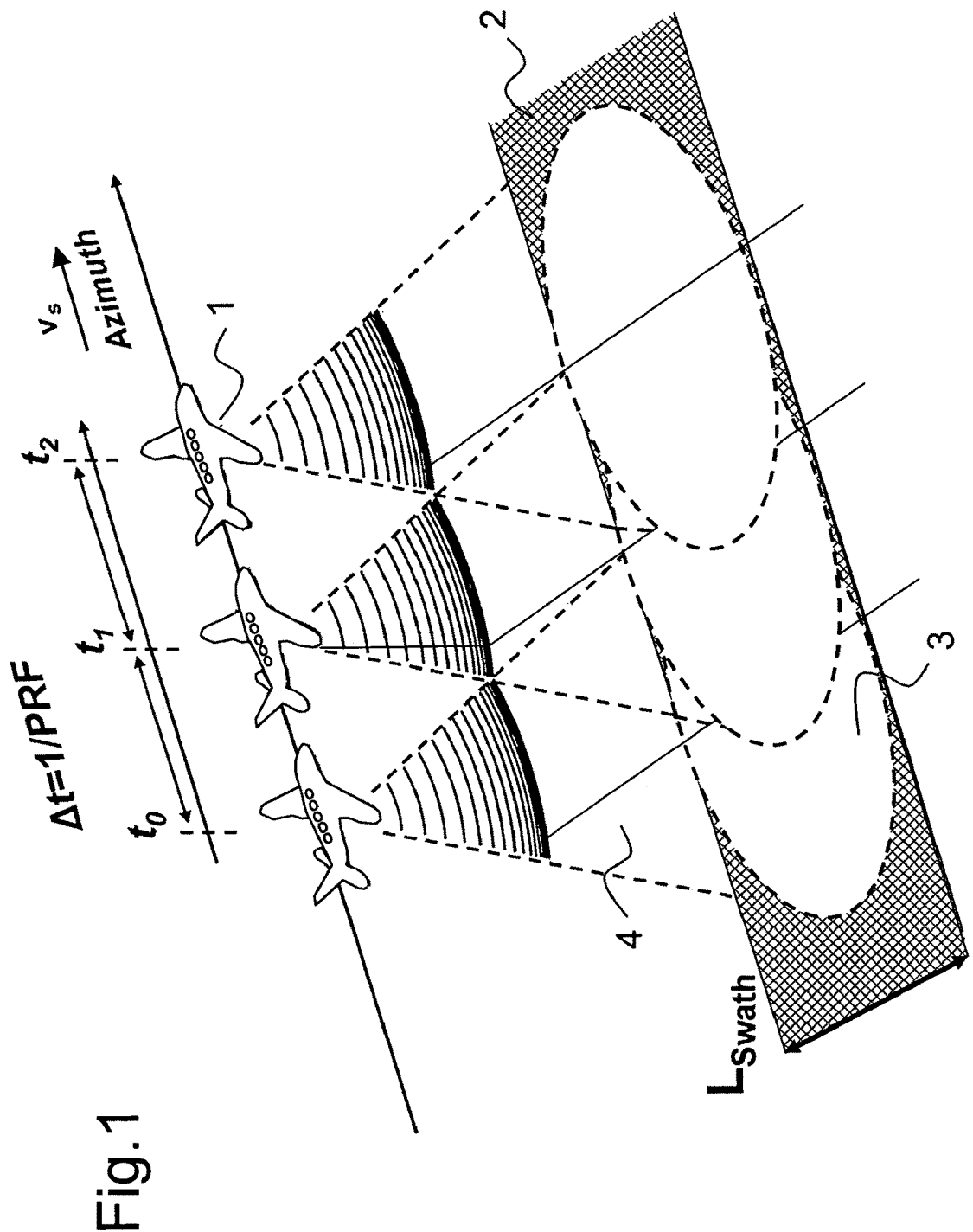
FIG. 1 is a schematic view of a conventional SAR system already described in the introduction, wherein a sensor moves along the azimuth direction at a constant speed v, and emits pulses at a pulse repetition frequency PRF that cover a swath of a width $L_{Swath}$ on the ground.
Figure 2:
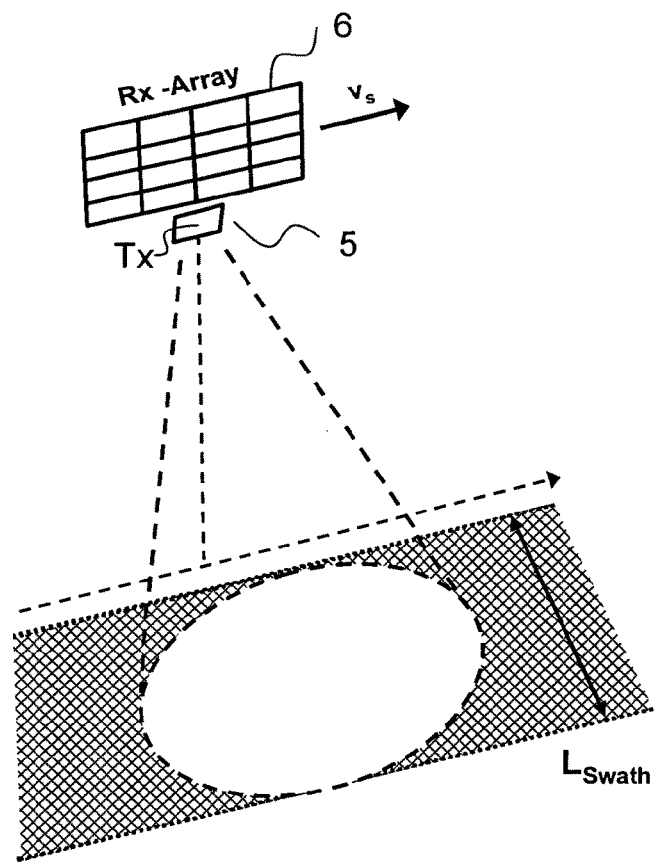
FIG. 2 illustrates a multi-aperture system, also explained above, for mapping broad swaths with a high resolution according to prior art, wherein the transmission and receiving antenna is situated on the same carrier platform and the receiving antenna is subdivided and is formed by a plurality of antenna elements both in the azimuth and in the elevation, whereas the transmission antenna is formed by a single element only whose dimensions correspond to the individual elements of the receiving antenna.
Figure 3:
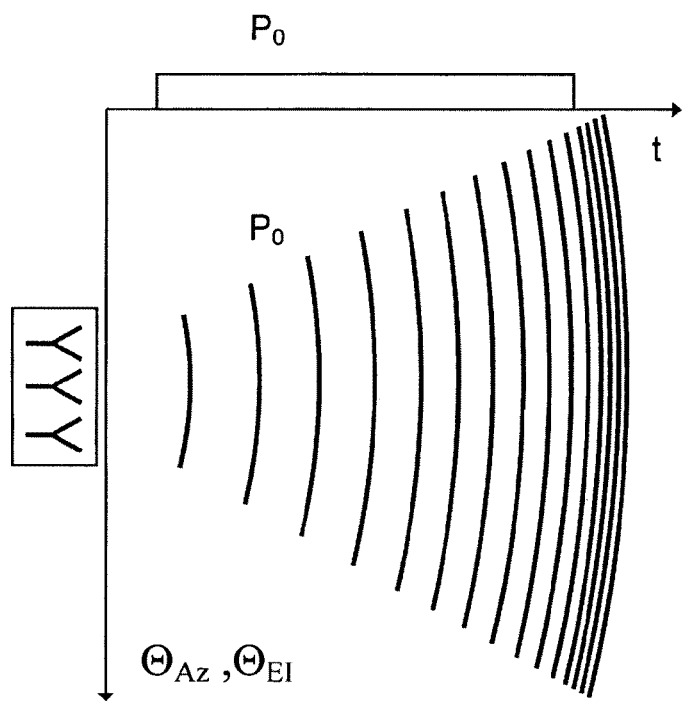
FIG. 3 is an example for a transmission pulse of a conventional SAR system, wherein the modulation of this pulse has no spatiotemporal diversity.

FIG. 4 illustrates the basic principle of the invention in comparison with prior art as illustrated in FIG. 3. FIG. 3 schematically illustrates the existing transmission antenna form for SAR systems with a mono-aperture and the emitted waveforms thereof. In comparison therewith, FIG. 4 schematically illustrates the new concept according to the invention using an exemplary multidimensional waveform. The receiving antennas belonging to the respective systems are not illustrated, since both cases are based on multi-aperture receivers that offer the possibility of a receiving-side beamforming.

Figure 5:
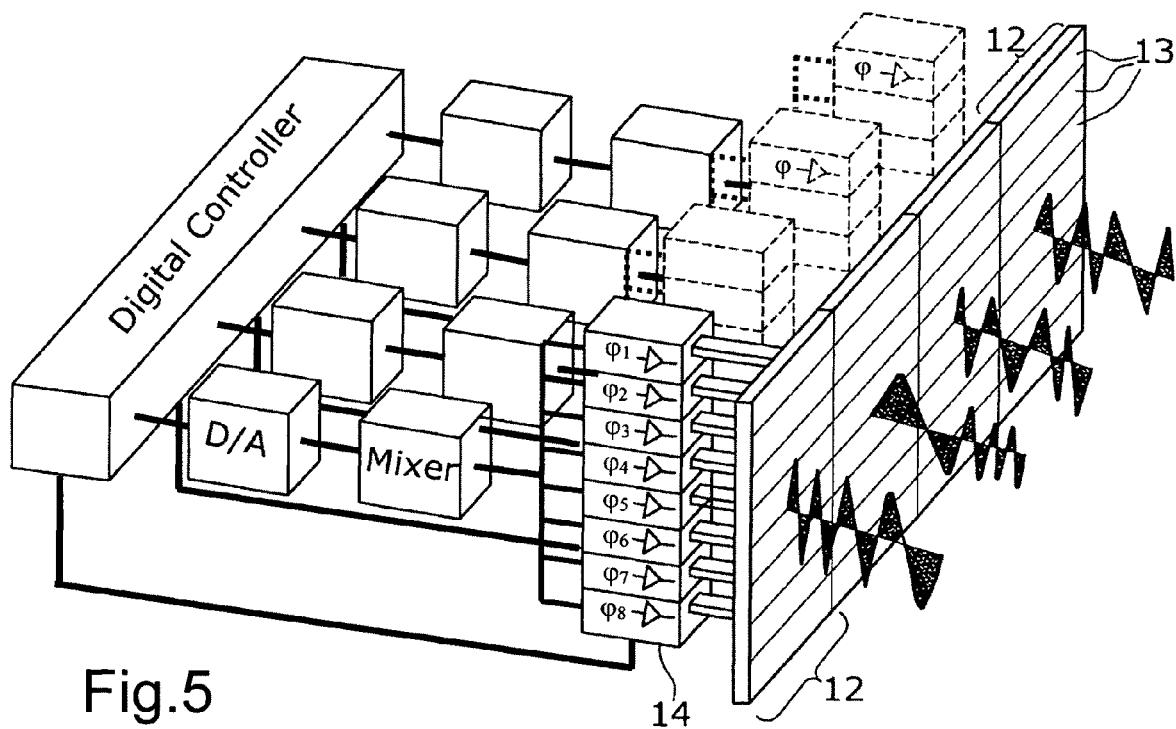

FIG. 5 is a schematic oblique view of a possible embodiment of a SAR system transmission antenna according to the present invention. Such an antenna can may be implemented in an advantageous and exemplary manner in the following embodiments.

The transmission antenna is a multi-aperture transmission antenna for multi-dimensional spatiotemporal pulse coding. The embodiment comprises four sub-elements 12 in the azimuth, which are respectively supplied by a function generator of their own. Further, the sub-apertures 13 are controlled in elevation through separate controllable phase shifters 14 so as to allow beamforming and beam controlling in the elevation direction.

Due to the use of spatiotemporally non-separable multi-dimensional waveforms in the azimuth, a clearly improved suppression of azimuth ambiguities can be achieved. To this avail, the waveforms emitted are shaped such that the radar echoes from different spatial angles, otherwise having the same scattering properties, lead to different received signals and can thus be separated in the receiver. In this context, a spatiotemporal coding of the emitted waveforms is of particular importance, wherein the radar echoes from scattering objects that are equidistant but are situated at different spatial angles, arrive temporally offset with respect to each other.

This also results in a temporal offset between the desired signal and the azimuth ambiguities corresponding thereto. However, such a temporal offset is equivalent to the fact that, at a given time and a radar directed obliquely downward, the ambiguities will arrive under another elevation angle than the desired signal. Thus, the receiving-side spatial filtering by means of "digital beamforming on receive" in the elevation can significantly reduce or even fully suppress the energy of the ambiguities.

Figure 6:
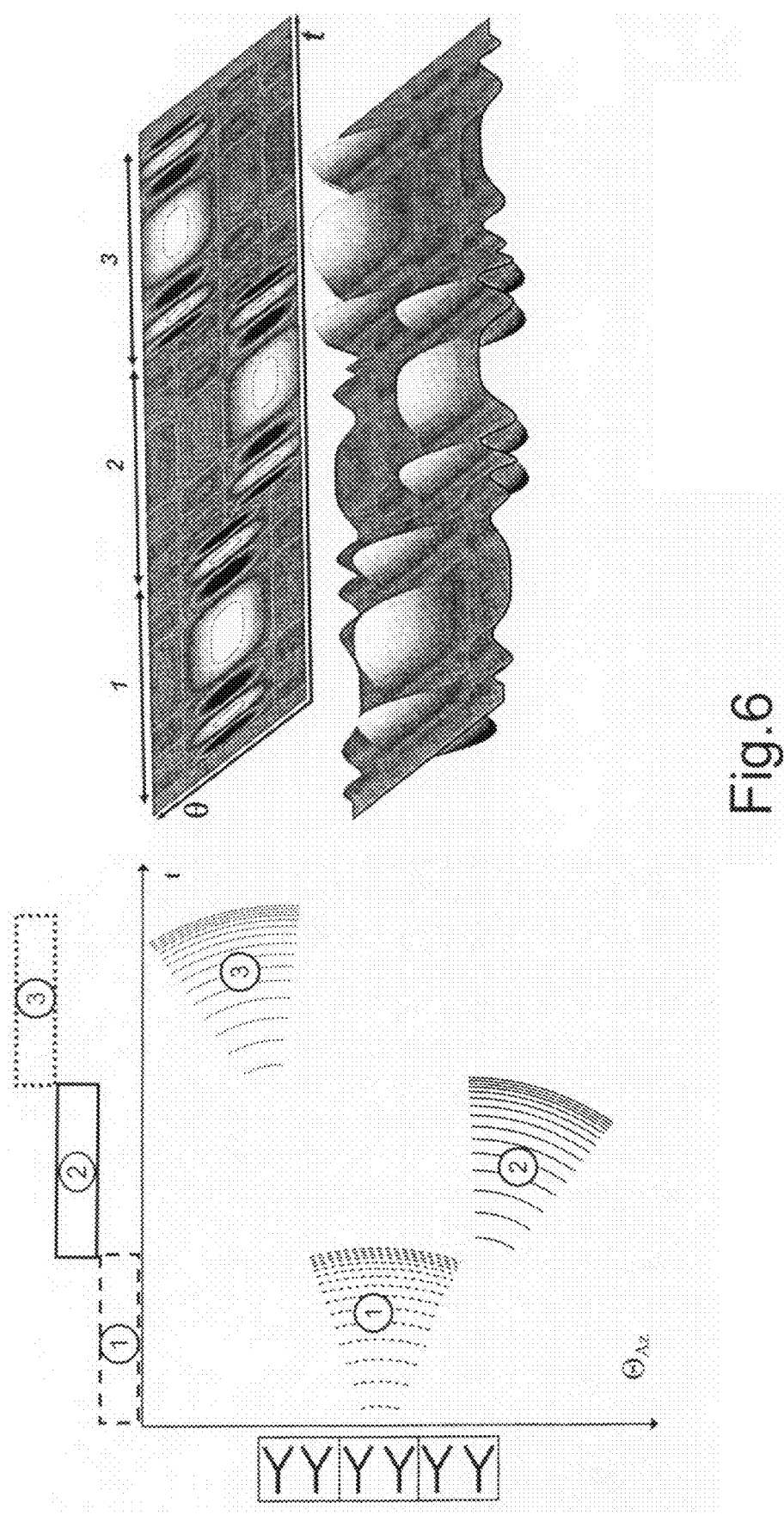

The following is a detailed explanation of an example for an application of such a waveform in the suppression of ambiguities. In this context, FIG. 6 illustrates a non-separable waveform in the azimuth. In the schematic illustration on the left and in the three-dimensional illustration on the right, a transmission pulse can be seen that is formed by three partial pulses in the range direction ("t"). This pulse is produced by a coherent superposition of the signal of all transmission modules that all transmit at the same time. Here, each partial pulse has another amplitude distribution in the azimuth direction ("$\theta_{Az}$").

Thus, within one pulse, a plurality of narrow azimuth beams are transmitted that each illuminate only a part of the azimuth spectrum and therefore limit the azimuth bandwidth in each of the partial pulses. This may be interpreted as a kind of band pass splitting in the azimuth. In the receiving branch of the radar system, this is manifested as a relative time-shift of the echo of a target, depending on which of the azimuth beams has caused the echo.

Figure 7:
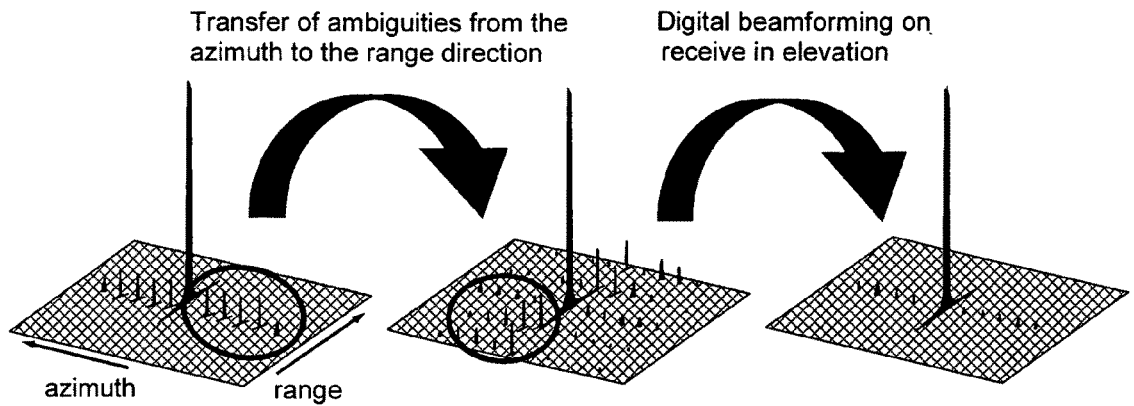

This time-shift materializes in the recorded data as a difference in the range direction and, in contrast with FIG. 7, left side, which illustrates the point target response of a conventional "digital beamforming" SAR system with four receiving apertures and only one transmission aperture, leads to a distribution of the energy of the azimuth ambiguities in the range direction, see FIG. 7, middle.

By "beamforming on receive", the echoes of different azimuth beams can clearly be separated by the time-shift and the energy previously only distributed in the range direction may now be suppressed, see FIG. 7, right side. Now, the echoes of the different azimuth beams may be combined so as to restore the full azimuth bandwidth and to thus allow for a full geometric resolution in the azimuth direction. This kind of signal processing may be interpreted as a signal reconstruction of a multi-channel band-pass splitting.

The diagram in the middle of FIG. 7 thus explains the distribution of the energy in the range direction by the use of four transmission apertures and the special transmission pulse form, as illustrated schematically in FIG. 6. On the right side in FIG. 7, the resulting point target response is illustrated, after the energy distributed in the range direction has been suppressed by "beamforming on receive" in the elevation. The remaining energy of the azimuth ambiguities is significantly reduced in contrast with systems that only use "digital beamforming on receive".

Another advantageous possibility, namely causing a reduction of the amount of data to be recorded, is offered by the control of the transmission beam within a transmission pulse in the elevation direction. Concretely speaking, this means that the antenna elements are used to form a narrow transmission beam in the elevation, which "wanders" across the target area during a transmission pulse and can thus, in total, illuminate a wide swath of ground.

This allows for a time-delayed illumination of different range areas with narrow transmission beams. This may be used, for example, to make the received echoes from different ranges coincide temporally. Here, however, the transmission beam remains long enough on each target area to illuminate it with the full bandwidth of the transmission signal. The signals arriving at the same time from different directions may then be separated from each other in the elevation by means of "digital beamforming on receive".

Since, in this method, the signals from different directions coincide temporally, a significant reduction of the receiving window can be achieved. On the one hand, this facilitates the timing of the SAR system and, on the other hand, provides for a significant reduction of the amount of data to be recorded. Compared with the previously suggested methods of a receiving-side beam forming in real time, the implementation of the transmission-side beam forming presented herein offers a greater robustness with respect to the topography of the area mapped.

Whereas in the case of a time-dependent beam forming in the receiving branch an erroneous association of beam angle and time can lead to massive losses in signal energy, the entire energy transmitted is also received in the case of the transmission-side realization of a time-dependent radiation angle. With great variations in the topography, limitations result, if at all, from an extension of the time interval in which all radar echoes are received. Such a variation may be counteracted effectively by a slight extension of the receiving window, which is equivalent to a slight increase of the amount of data, which, however, has already been significantly reduced.

Compared with the conventional processing, however, this increase is negligible. Two advantages are obtained over the tracking of the receiving beam in real time, as suggested in EP 1 241 487 B1, namely that no signal attenuation or full signal extinction caused by topography exists, and that the great technical effort for a signal processing in real time in the receiver is avoided.

Moreover, the use of a very long transmission pulse and of a comparatively short receiving window reduces the required peak power of the radar pulses. This is of basic importance for the technical design of the transmitter and allows for the implementation of more economic electronic components. Another advantage of a SAR system thus designed is that a large transmission antenna can be used to illuminate a wide swath.

Figure 8:
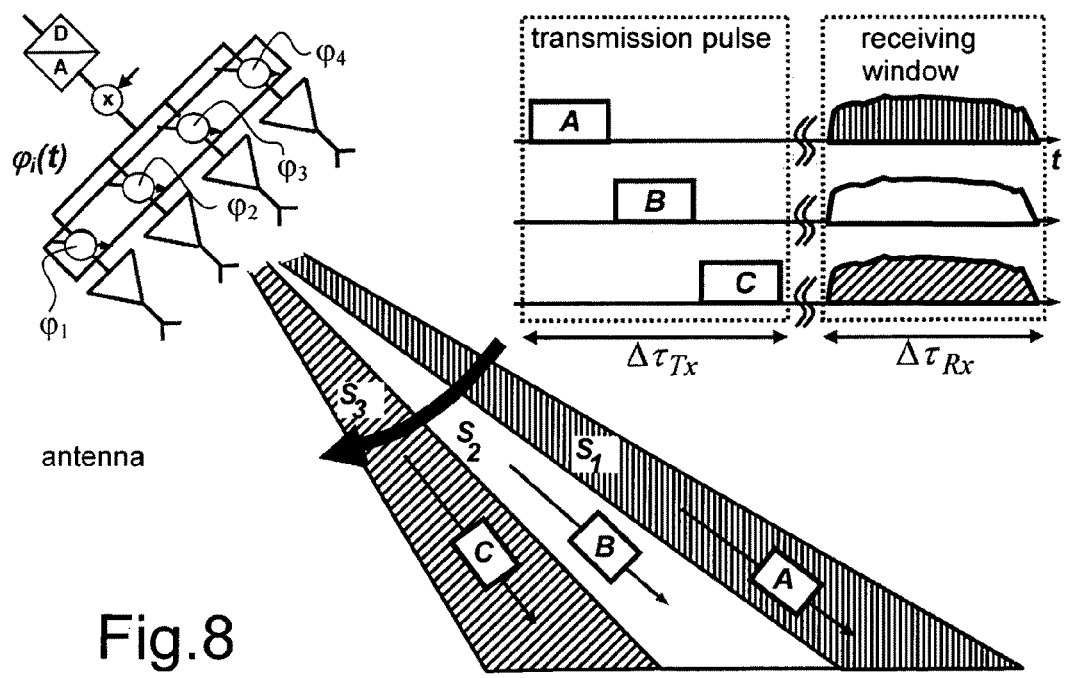

FIG. 8 illustrates an example of the previously explained system with three different forms A, B, C of the transmission beam, while a single pulse is transmitted over the transmission pulse interval $\Delta\tau_{Tx}$. Here, the temporal dependence is chosen such that the temporal overlap, illustrated on the top right side of FIG. 8, of the echoes received during the duration $\Delta\tau_{Tx}$ of the receiving window is guaranteed. Thus, this is a time-dependent variation of the radiation angle in the elevation. Such a time-dependent variation entails a simultaneous reception of the respective echoes. In the example illustrated, the ground area to be mapped is covered by three partial beams $S_1$, $S_2$, $S_3$ that are controlled sequentially in the direction of the respective associated elevation angle within a transmission pulse.

A SAR system configured according to the invention also allows for an increase in the sampling rate. Thus, the transmission pulse is produced by the sequential controlling of the individual transmission elements, i.e. all transmission elements transmit within a total pulse, yet only one at a time in each partial pulse. In contrast with the previously described embodiment of the SAR system of the present invention, the transmission pulse is thus not interpreted as the coherent superposition of the individual pulses of all transmission elements which together form a desired antenna diagram, but—after an appropriate spatial filtering of the received signal by means of "digital beamforming on receive"—every transmission element may be interpreted as a quasi independent transmitter.

Figure 9:
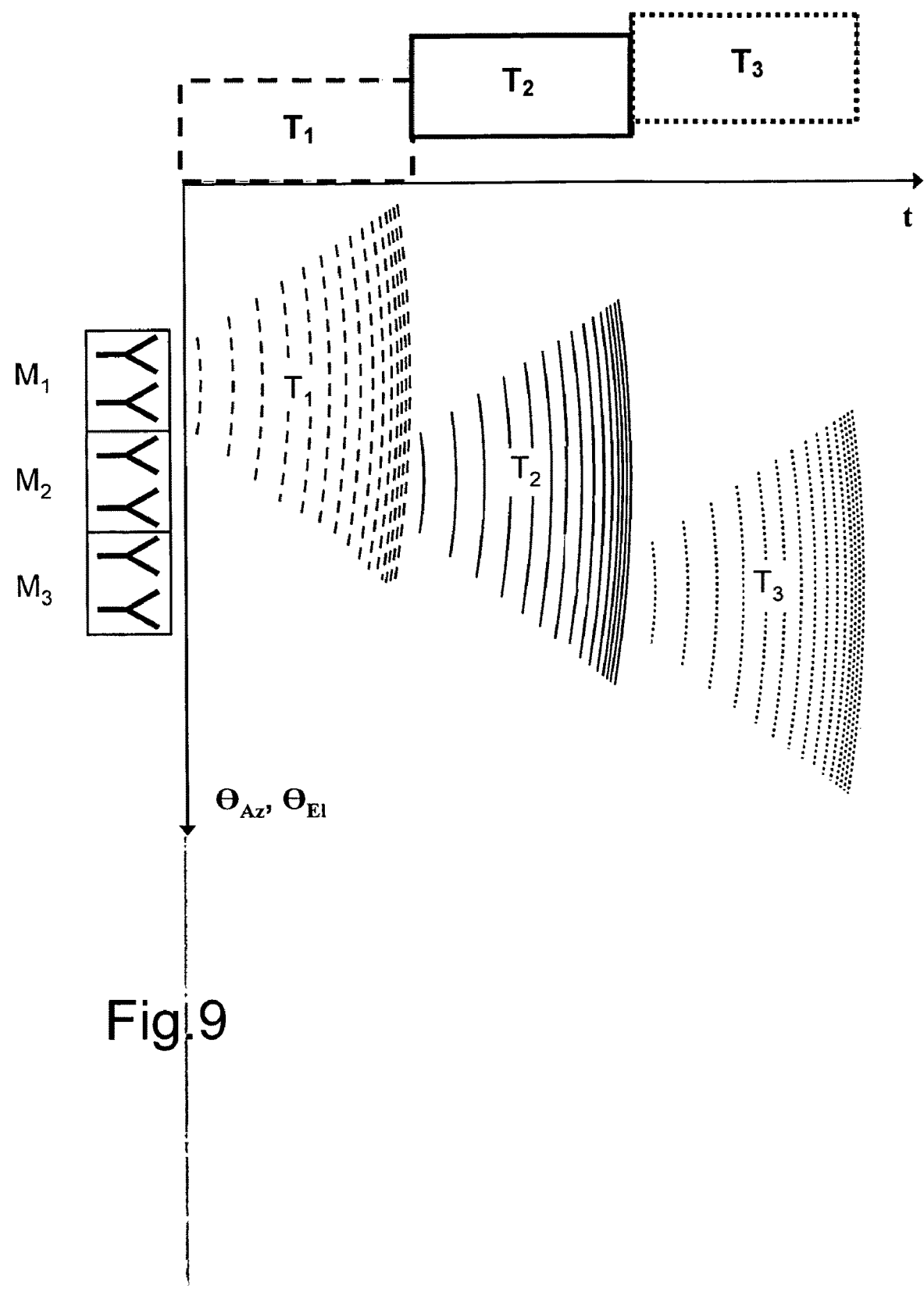

The following is a simple and illustrative embodiment of an antenna with three independent transmission modules that correspond to three transmission elements. The resulting waveform is schematically represented in FIG. 9. FIG. 9 shows the waveform of a transmission pulse with a spatially sequential "coding". The case illustrated shows the sequential control of the transmission modules $M_1$, $M_2$ and $M_3$, as well as the associated emitted Partial pulses $T_1$, $T_2$ and $T_3$.

SAR systems with spatially separated transmitter and receiver may be interpreted as a virtual system, wherein the positions of the transmitter and the receiver coincide and lie in the middle between the actual positions of the transmission and receiving apertures. This location is referred to as the effective phase centre of a transmitter/receiver combination.

Due to the fact that only one transmission aperture is active at a given time, the reflected echoes of a certain target, resulting from the partial pulse of the respective transmission aperture, are received at different times. These different echoes may then be separated by means of an appropriate processing on the receiving side. Thus, the transmission antenna array may finally be interpreted as being subdivided into a plurality of stand-alone transmitters, as illustrated in FIG. 11. Due to the various possible combinations of transmission and receiving apertures, the sampled values, identified by "x", per transmission pulse are obtained therefrom, which correspond to the effective phase centres of all possible combinations of transmitter and receiver.

FIG. 10 illustrates the effective phase centres and thus the sampled values in the azimuth for a conventional combination of a simple transmission antenna (Tx) and multi-aperture receiving antenna (Rx) with N receiving elements. N sampled values are obtained per transmission pulse. In contrast therewith, FIG. 11 shows the effective phase centres and thus the sampled values in the azimuth dimension for N Tx/Rx modules that each transmit with a sequential "code". In this case, 2N−1 sampled values are obtained per transmission pulse.

It is obvious that, as compared to a conventional SAR system, illustrated in FIG. 10 and having N (=number of receiving apertures) sampled values, 2·N−1 sampled values are obtained now, where N is the number of the independently operated T/R modules. This corresponds to an increase in the sampling rate by a factor of $$\frac{2 \cdot N - 1}{N}$$

(≈2 for large N).

This increased sampling rate may be used in various respects. It may be used, e.g. to increase the resolution without boosting the azimuth ambiguities, or vice versa, to allow for an improved suppression of the azimuth ambiguities with a constant resolution.

Another aspect is illustrated in FIG. 12. It results from the maximum distance between two sampled values that are obtained for the reception of an emitted pulse with a plurality of apertures. This so-called base line describes the sensitivity of the system regarding the detection or determination of moving objects. As can be seen in FIG. 12, the length of this base line doubles when the special transmission pulse form is used.

Since, especially in conventional systems located on a carrier platform, this base line is often too short to effectively detect moving objects and to determine velocities, the doubled length of the base line results in a clearly improved possibility for the detection of moving objects. Conversely, a dedicated radar system for measuring movement may be built much more compact using the system proposed herein by the present invention.

In detail, FIG. 12 shows the effective phase centres, identified by "x", and the resulting maximum base line for the conventional case (left side) and with the use of sequential pulse forms within a transmission pulse (right side). Compared with the conventional case, the above-mentioned doubling of the length of the base line is obtained by the use of spatiotemporally non-separable transmission pulses. In both cases, the velocity v of a moving object is determined.

The use of spatiotemporally non-separable waveforms according to the present invention allows for a purposeful illumination of the target area, wherein it is possible to obtain a better spatial resolution and/or a higher radiometric sensitivity by different dwelling time of the transmission beam in certain partial areas. Thus, it is possible to allocate greater system resources to partial areas of greater importance without completely neglecting other areas, as is the case for the conventional spotlight mode.

This flexibility allows for an operation of synthetic aperture radar systems in hybrid modes, where, for example, on the one hand, large areas are to be mapped continuously and, on the other hand, detail pictures of limited partial areas are to be made according to specific wishes of a client. The areas to which more resources are allocated may even be selected adaptively. A simple example is the optimization of the signal-to-noise ratio SNR by a dynamic adaptation of the spatiotemporal waveform to the evaluation of the received signal power for individual partial areas.

Entirely independent hereof, the general decoupling of the antenna size and the extension of the illuminated area on the ground allow for the use of a large transmission antenna with a high gain. Together with the above explained prolongation of the transmission pulse time, this yields the possibility of operating with an overall higher transmission power or a lower peak power per surface/transmission module. All this contributes to a clear enhancement of the performance of future SAR radar systems.

In a SAR system configured according to the present invention, spatiotemporally non-separable waveforms advantageously allow for a flexible "distribution" of the signal energy on the ground and—in combination with "digital beamforming on receive"—allow for a better suppression of ambiguities, an effective reduction of the amount of data, an increase in the spatial sampling rate, a higher sensitivity for movement measurements, more compact satellite structures and a simplification of the system design. Thereby, it becomes possible to realize SAR systems with a higher geometric resolution and a large width of the ground swath in a most effective manner.

LIST OF REFERENCE NUMERALS 1 carrier
2 swath of ground
3 incident area
4 antenna lobe
5 transmission antenna
6 receiving antenna
7, 8, 9 sub-apertures
10 transmission antenna
11 transmission antenna with single aperture
12 sub-element in the azimuth
13 sub-apertures in the elevation
14 controllable phase shifters
A, B, C forms of the transmission beam
$L_{Swath}$ width of swath
$M_1$, $M_2$, $M_3$ transmission module
$P_0$ transmission pulse $P_1, P_2, P_3$ sub-pulses
PRF pulse repetition frequency
Rx receiver
$S_1, S_2, S_3$ partial beams
$t_0, t_1, t_2$ pulse emission times
$T_1, T_1, T_2$ partial pulses
Tx transmitter
v velocity
$v_s$ velocity of the carrier
$\Delta t$ time interval between pulses
$\Delta t_{Rx}$ duration of the receiving window
$\Delta t_{Tx}$ duration of transmission pulse

The invention claimed is:

1. A high-resolution synthetic aperture side-looking radar system on a vehicle moving above the earth surface at a constant speed, the vehicle being provided with a coherently operating radar device comprising a transmission antenna directed obliquely downward orthogonal to the direction of movement and formed by spatially separated sub-apertures, and a receiving antenna correspondingly directed obliquely downward orthogonal to the direction of movement and divided into a plurality of spatially separated sub-antennas, the coherently operating radar device emitting radio frequency signals via the spatially separated sub-apertures of the transmission antenna, a respective radio frequency signal of the radio frequency signals being emitted through a respective spatially separated sub-aperture of the spatially separated sub-apertures of the transmission antenna and forming a respective transmission element, the coherently operating radar device receiving echo signals of the emitted radio frequency signals in a plurality of receiving channels via the spatially separated sub-antennas of the receiving antenna, wherein the transmission antenna periodically emits radio frequency pulses at a pulse repetition frequency, wherein the radio frequency signals emitted from the sub-apertures of the transmission antenna are all respectively emitted within a single radio frequency pulse of the radio frequency pulses emitted periodically by the transmission antenna, and, as a transmission signal pulse form, result in a spatiotemporally non-separable multidimensional radio frequency waveform per radio frequency pulse, and wherein, to achieve a spatial filtering, the echo signals received in the receiving channels by the receiving antenna, which is subdivided into a plurality of sub-antennas in at least one of the azimuth and elevation directions, are digitally processed by digital beamforming in the form of additional directional information and the transmission signal pulse form generated on the transmission side is combined with the receiving-side spatial filtering via the digital beamforming adapted to this transmission signal pulse form.

2. The radar system of claim 1, wherein the transmission antenna formed by a plurality of sub-apertures is structurally combined with the receiving antenna that comprises a plurality of sub-antennas and allows for digital beamforming.

3. The radar system of claim 1, wherein, within a transmission pulse, the individual transmission elements, and thus sub-apertures, of the transmission antenna are controlled such in at least one of the azimuth and the elevation by varying the respective phase coefficients that radar transmission pulses with a spatiotemporally non-separable waveform are obtained.

4. The radar system of claim 1, wherein, within a transmission pulse, the individual transmission elements, and thus sub-apertures, of the transmission antenna are controlled in at least one of the azimuth and the elevation by separate function generators such that radar transmission pulses with a spatiotemporally non-separable waveform are obtained.

5. The radar system of claim 1, wherein, within a transmission pulse, individual or, at the same time, a plurality of transmission elements, and thus sub-apertures, of the transmission antenna are controlled sequentially in the azimuth and the elevation such that radar transmission pulses with a spatiotemporally non-separable waveform are obtained.

6. The radar system of claim 1, wherein the transmission antenna is configured as a multi-aperture transmission antenna for multi-dimensional spatiotemporal pulse coding, including n sub-elements in the azimuth, each supplied by a function generator of its own, and m sub-apertures in the elevation per azimuth column, which are controlled through separate controllable phase shifters to allow the forming and controlling of the beam in the elevation direction.

7. The radar system of claim 1, wherein, for an improved suppression of azimuth ambiguities, spatiotemporally non-separable multi-dimensional waveforms are used in the azimuth, which are designed such that the radar echoes from different spatial angles, with otherwise similar scattering properties, lead to different received signals and are therefore separable from each other in the receiver.

8. The radar system of claim 7, wherein a spatiotemporal coding of the emitted radio frequency signal is provided, where the radar echoes from scattering objects at the same distance but at different spatial angles arrive at the receiver chronologically offset so that also a chronological offset between the desired signal and the azimuth ambiguities corresponding thereto is obtained, which is equivalent to the fact that, at a given time, with a radar directed obliquely downward, the ambiguities arrive under another elevation angle than the desired signal, so that the energy of the ambiguities can be significantly reduced or even be completely suppressed by the receiving-side spatial filtering by digital beamforming on receive in the elevation.

9. The radar system of claim 7, wherein the transmission pulse is generated by the coherent superposition of the signals of all transmission elements which all transmit at the same time, wherein each partial pulse comprises a different amplitude distribution in the azimuth direction and a plurality of narrow azimuth beams are thus transmitted within a pulse which each only illuminate a part of the azimuth spectrum and therefore limit the azimuth bandwidth in each of the partial pulses in the manner of a band pass splitting in the azimuth, which, depending on which of the azimuth beams causes the echo, materializes in the receiving branch of the radar system as a relative time-shift of the echo from a target, which time-shift shows in the recorded data as a difference in the range direction and causes a distribution of the energy of the azimuth ambiguities in the range direction, wherein, by digital beamforming on the receiving side, the echoes of different azimuth beams are separated by the time-shift and the energy distributed in the range direction is suppressed, and wherein the echoes of the different azimuth beams are combined in the manner of a signal reconstruction of a multi-channel band pass splitting, in order to restore the complete azimuth bandwidth and to thus allow for the full geometric resolution in the azimuth direction.

10. The radar system of claim 1, wherein the transmission beam is controlled in the elevation direction within one transmission pulse, so that the antenna elements form a narrow transmission beam in the elevation that wanders across the target area during the duration of the transmission pulse, thereby, on the whole, illuminating a wide ground swath which results in a time-delayed illumination of different range areas with narrow transmission beams.

11. The radar system of claim 10, wherein the transmission beam control is effected such that the echoes received from different directions coincide chronologically, wherein the transmission beam dwells on each target area long enough to illuminate each target area with the entire band width of the transmission signal, and wherein the signals from different directions that arrive simultaneously are separated from each other using receiving-side digital beamforming in the elevation.

12. The radar system of claim 10, wherein a receiving window is provided that is greatly reduced in duration as compared to the duration of the radar transmission pulse.

13. The radar system of claim 12, wherein the duration of receiving window is calculated to be so long that all radar echoes are received within its opening time interval.

14. The radar system of claim 1, wherein the transmission pulse is generated by sequentially controlling the individual transmission elements according to a sequential code, wherein all transmission elements transmit within a total pulse, but only one at a time in each partial pulse.

15. The radar system of claim 14, wherein the reflected echoes of a certain target, which result from a partial pulse of the respective transmission pulse and are received at different times, are separated by an appropriate processing on the receiving side.

16. The radar system of claim 14, wherein a detection or determination of moving objects is achieved by using a base line that corresponds to the maximum distance between two sampled values that are obtained for the reception of an emitted pulse with a plurality of transmission elements, and which is extended by the use of the special transmission pulse form.

17. The radar system of claim 1, wherein a purposeful illumination of the target area is provided, so that at least one of a better spatial resolution and a higher radiometric sensitivity is achieved by at least one of different dwelling times of the transmission beam in certain partial areas and a variation in the system resources.

18. The radar system of claim 17, wherein an operation in hybrid modes, wherein, at the same time, large areas are mapped and detail pictures of limited partial areas are made.

19. The radar system of claim 17, wherein the radar system is adapted to allocate differing amounts of resources to different areas to be mapped.

20. The radar system of claim 17, wherein the radar system performs an optimization of the signal-to-noise ratio by a dynamic adaptation of the spatiotemporal waveform to the evaluation of the received signal power for individual partial areas.

* * * * *